(12) United States Patent
Costeff et al.

(10) Patent No.: US 12,468,688 B1
(45) Date of Patent: Nov. 11, 2025

(54) EFFICIENT TRANSACTION MANAGEMENT

(71) Applicant: VAST DATA LTD., Tel Aviv (IL)

(72) Inventors: Hillel Costeff, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 115 days.

(21) Appl. No.: 18/427,755

(22) Filed: Jan. 30, 2024

(51) Int. Cl.
*G06F 16/23* (2019.01)

(52) U.S. Cl.
CPC ............................... *G06F 16/2379* (2019.01)

(58) Field of Classification Search
CPC .................................................. G06F 16/2379
See application file for complete search history.

(56) References Cited

U.S. PATENT DOCUMENTS 11,068,299 B1 * 7/2021 Armangau ............ G06F 3/0688
11,886,422 B1 * 1/2024 Li ....................... G06F 16/2379
2022/0114100 A1 * 4/2022 David ................. G06F 12/0815
2023/0222218 A1 * 7/2023 Lockman, III ............ G06F 8/63
         726/22
2024/0184767 A1 * 6/2024 Krishnan ............ G06F 16/2365

* cited by examiner

*Primary Examiner* — Kris E Mackes
(74) *Attorney, Agent, or Firm* — Reches Patents (57) ABSTRACT

A method for metadata blocks access, the method includes (i) accessing, following a reception of an access request, a metadata block related to a file system entity; the metadata block is associated with a transaction identifier that is indicative of a transaction that is a most recent transaction that modified the metadata block; (ii) traversing, starting from the metadata block, metadata blocks that are transaction related, using linkage metadata within the metadata blocks; (iii) determining, based on an outcome of the traversing, a status of the transaction; (iv) when it is determined that the transaction was successfully completed then completing the access request by using content that was written by the transaction to the metadata block; and (v) when it is determined that the transaction failed then ignoring content that was written by the transaction to the metadata block.

18 Claims, 6 Drawing Sheets

EFFICIENT TRANSACTION MANAGEMENT

BACKGROUND

A storage system is used for storing filesystem files and directories and metadata describing the files and directories. Updates of files and directories (create, rename, delete, move, etc.) are performed as part of transactions, where each transaction may involve multiple operations and may even impact multiple filesystem files and/or directories. There is a constant need to track transaction statuses, so that only updates that where performed by committed transactions—are considered as valid updates. There may be provide a storage system, a method and a non-transitory computer readable medium for no commit transactions.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

When a filesystem entity (e.g., file, directory) is added, deleted or updated, multiple metadata blocks may need to be updated. For example, when a new file (or directory) is added, two or more metadata structures need to be updated: the parent directory needs to be updated with a new entry containing the name of the file (or directory), and a new file entry is added to include a file identifier (handle, inode) and file metadata-attributes, pointers to data, etc. Each update of such a metadata structure may involve updating multiple metadata blocks (e.g., metadata block containing attributes, one or more metadata blocks containing pointers). When a file is deleted, the same metadata structures are updated to reverse the above operations, i.e., to delete the file from its parent directory and to delete the file entry. A rename operation involves even more updates of data structures, since there is a need to delete the file from one directory and to add the file to a different directory. An update of a file may include updating several data structures that store attributes and added or deleted metadata blocks' locations.

According to an embodiment, the linkage metadata of the metadata block includes one or more pointers to one or more other metadata blocks, wherein a number of the one or more pointers is determined based on a defined tradeoff between metadata block vacancy and a duration of the traversal According to embodiments of the invention, a transaction for updating a filesystem entity (FSE, e.g., a file, a directory, an object, and even a database table) that includes multiple metadata blocks, may be executed regardless of a certain order of the metadata block updates. Furthermore, the multiple metadata block updates can be executed in parallel to each other, rather than performing metadata block updates in a serial manner. There is no dependency between updates and no need for executing updates in a certain order.

The transaction handling does not need to keep a journal for logging the transactions, or managing any transaction state data structures, and there is no need to register a transaction as uncommitted or committed. There is also no need to keep a certain sequence or order of updates according to predefined dependencies. Instead, all the required updates can be performed in parallel, and without needing to log the transaction into a journal record.

When starting to perform a certain FSE transaction (for responding to a request to create, update, delete, move or rename, etc.) that includes multiple metadata block updates, all the involved metadata blocks that need to be updated as part of the transaction, are identified. Each involved metadata block, in addition to being written with updated content according to the request, is also updated with transaction information, that includes a transaction identifier and a linkage metadata, which may be implemented as a block reference list that includes references to one or more of other involved metadata blocks that are to be updated during the transaction. Each involved metadata block is further being referenced by at least one of the other involved metadata blocks. It is noted that the metadata blocks include content describing the FSE itself (e.g., attributes of a file, pointers to stored data), besides the linkage metadata, that describes information related to the transaction (such as the identities of the involved blocks).

For example, suppose there are four involved metadata blocks that need to be updated during a transaction. In addition to updating the block content (metadata describing the FSE) that needs to be done to each involved metadata block, the transaction information is also added when writing the updated content to the metadata block. Each metadata block needs to be referred to by at least one of the others, and each of the metadata blocks can point to one, two or all of the three other metadata blocks. A larger number of pointers to other metadata blocks consumes more space within the updated metadata block, but may facilitate a subsequent process of figuring out whether the transaction was completed successfully.

According to one example, each involved metadata block refers to one of the other involved metadata blocks and each involved metadata block is referred to by one involved metadata block. This approach can be used when the free space in the metadata blocks is low or when there is a need to spare space.

Figure 1:
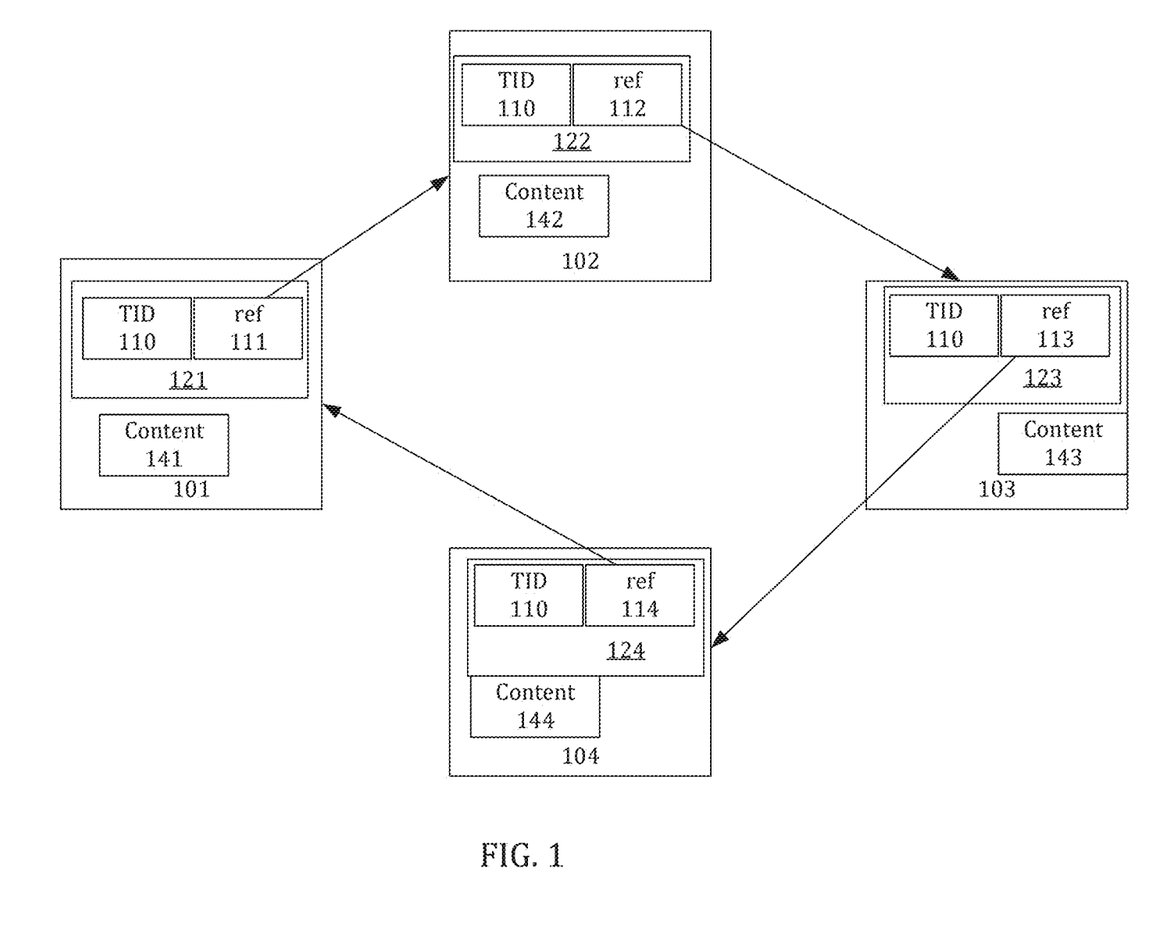
FIG. 1 illustrates an example of a metadata blocks.

FIG. 1 illustrates four metadata blocks 101-104 that are involved in a transaction. The transaction wrote transaction information 121-124 to each metadata block that was updated by the transaction, in addition to writing other content 141-144, in accordance with the requested storage operation. The transaction identifier (TID) 110 is a unique identifier that uniquely identifies the transaction among other transactions being (or were) executed in the storage system. All the metadata blocks 101-104 are stamped with the same TID 110, that correlates all the metadata blocks to the same transaction. The first metadata block 101 includes transaction information 121 that includes, in addition to TID 110, a list of references, such as ref 111, which in this case includes only one reference to the second metadata block 102. Similarly, the second metadata block 102 includes a list of references, such as ref 112, which in this case includes only one reference to the third metadata block 103. Similarly, metadata blocks 103 and 104 include ref 113 and 114, respectively, that point to metadata blocks 104 and 101, respectively. In this example, each metadata block points to one other metadata block and is being pointed at by one other metadata block.

Figure 2:
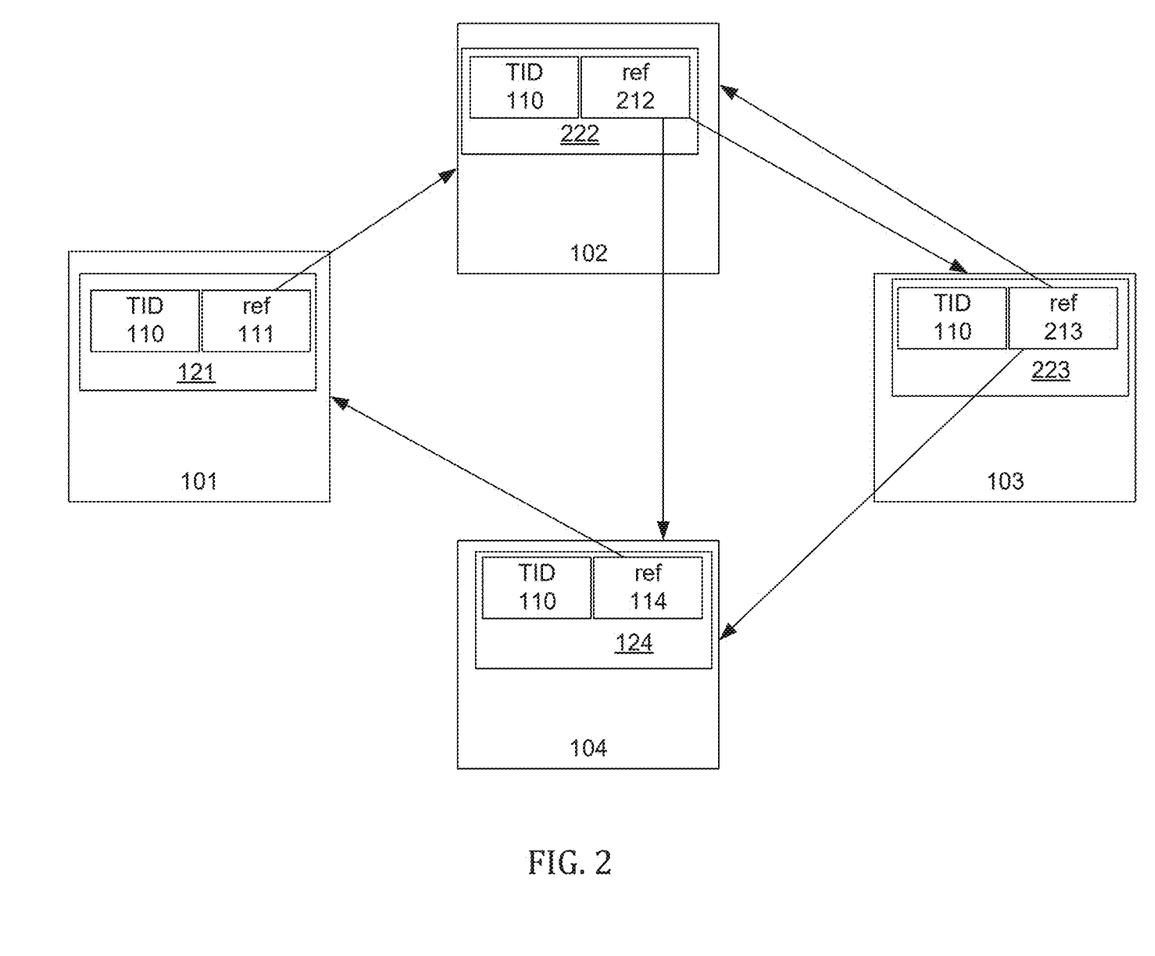
FIG. 2 illustrates an example of metadata blocks.

According to a second example, each metadata block or part of the metadata blocks may refer to more than one other metadata block. For example, FIG. 2 illustrates the reference list 212 of metadata block 102 as pointing to two other metadata blocks 103 and 104, and reference list 213 of metadata block 103 as pointing to two other metadata blocks 102 and 104.

Figure 3:
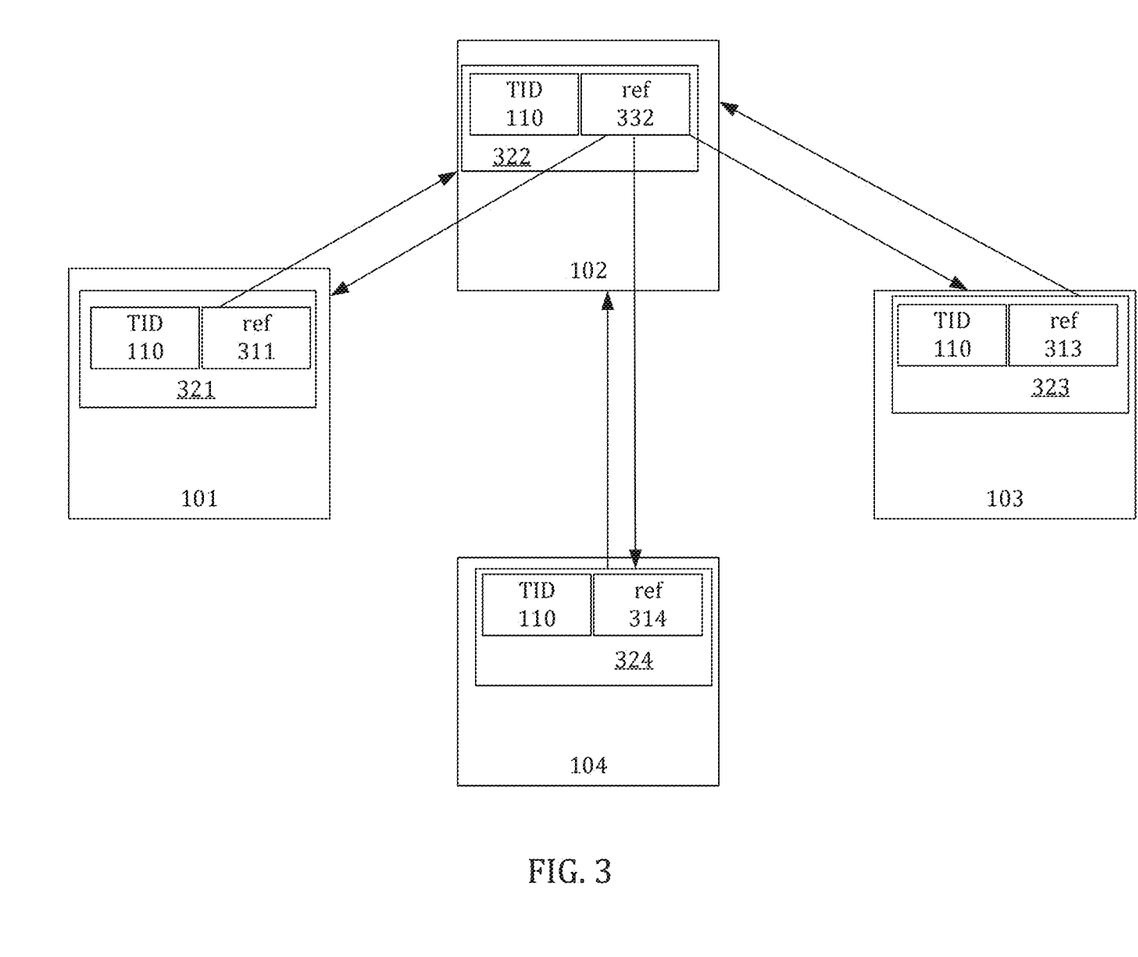
FIG. 3 illustrates an example of a shared metadata blocks.

FIG. 3 illustrates a third example of a star-like references, where the transaction information 322 of metadata block 102 includes a reference list 332 that refers to all the other metadata blocks, and each of the other metadata blocks refers back to metadata block 102 (transaction information 321, 323 and 324 include reference lists 311, 313 and 314, respectively, that refer to metadata block 102 only).

The decision of how many references to other metadata blocks should be included in each updated metadata block may be dependent on the amount of free space in the metadata block, or the amount of space that expected to be occupied by metadata content other than the transaction information. For example, a pointer metadata block (a metadata block that includes pointers to data) of a large file or a file that is frequently being written to, is expected to be almost entirely filled up with pointers. So, even if such a pointer metadata block yet includes a large amount of free space, it is expected to be exhausted soon, and it may be preferred to add a small number of references, or even only one reference to another metadata block. If the metadata block has a large amount of free space and the metadata block is not expected to be filled up with metadata content—then it may be decided to add multiple or all the pointers to other metadata blocks. Therefore, the decision may rely, for example, on the amount of free space, on a type of the metadata block, on an estimation of the expected fill-up pace of the metadata block, etc.

The decision may further take into account, which metadata block is usually accessed, or accessed first, when accessing the FSE. For example, a metadata block that includes file attributes may be a metadata block that is usually accessed first, and therefore it may be decided to store all the references to other metadata blocks in such a metadata block. This approach will facilitate a faster analysis of the transaction completion state, as will be described herein.

At the end of the transaction, there is no need for updating the status of the transaction as a committed transaction, and instead, the completeness of the graph of references indicates the completion of the transaction. In order for the transaction to be considered as completed—all the metadata blocks should be pointed by at least one other metadata block.

The determination about the completeness of the transaction may be performed by a background process that scans the metadata blocks, or—by a subsequent access request, that is not part of the above transaction, as described below.

When a received access request (that is not part of the transaction) addresses a metadata block, and it is detected that the metadata block is stamped with transaction information, indicating that a recent transaction was performed on the metadata block, there is a need to check the status of the transaction. The transaction may be either: completed, failed (e.g., failed due to a failure of the compute entity that executed the transaction), or an ongoing (not yet completed) transaction. If it is determined, according to the graph of references, that the transaction is completed—the access request may proceed and rely on the content that was updated by the transaction and found in the accessed metadata block. If it is determined, according to a non-completed graph of references that the transaction is not completed, the status of the compute entity that executed the transaction may be checked, and if the status indicates that the compute entity is failed—then the content that was written by the transaction is ignored, and the transaction may be rolled back. If it is determined that the transaction is not completed, and that the status of the compute entity that executes the transaction indicates a non-failed compute entity (either because the compute entity is operational, or because the failure has not been detected yet)—then the checking of the transaction status will be delayed and retried.

When a metadata block (also referred to as the block of interest) of a FSE is being accessed in response to an access request that follows the transaction, the metadata block is checked for an existence of transaction information. When detecting an existence of transaction information in the metadata block, the reference list is read, and a recursive traversing starts across the chain of metadata blocks, starting from the metadata blocks included in the reference list of the first accessed metadata block, and continuing with the metadata blocks referred by the referred metadata blocks encountered along the path, until reaching all the metadata blocks that were involved in the transaction, or until determining a non-completed transaction.

A non-completed transaction is a transaction that at least one of the encountered metadata blocks is not referred to by any other metadata block, for example, when the first accessed metadata block may not be found in any of the metadata block references encountered during the traversal, or when a metadata block points to another metadata block that does not includes transaction information, or includes transaction information of another transaction (e.g., a transaction identifier that does not match the transaction identifier of previously traversed metadata blocks).

The traversal of the example of FIG. 1 may be the most time-consuming traversal, since it requires three metadata blocks read in a serial manner, i.e., one after the other (in addition to reading the metadata block of interest), in order to conclude that the transaction is completed, no matter which metadata block is the metadata block of interest that started the traversal. For example, if metadata block 101 is the metadata block of interest, then after obtaining reference list 111, metadata block 102 is read, then—after obtaining reference list 112, metadata block 103 is read, then—after obtaining reference list 113, metadata block 104 is read.

The traversal of FIG. 3, when the metadata block of interest that initiated the traversal is metadata block 102, requires one step of three parallel reads of the three metadata blocks pointed by metadata block 102. If the metadata block of interest is any other metadata block, e.g., metadata block 101, then the reading of all the metadata blocks is done in two steps: the first step is accessing metadata block 102 referred by reference list 311, and a second step of reading metadata blocks 103 and 104, in parallel.

The transaction that writes transaction information 321-324 may decide that metadata block 102 will store three references to all the other metadata blocks, because, for example, metadata block 102 is the metadata block that is most probably the first metadata block of the FSE to be read when accessing the FSE, or/and because metadata block 102 has sufficient space, while the other metadata blocks lack free space or are expected to be filled up with content.

Figure 4:
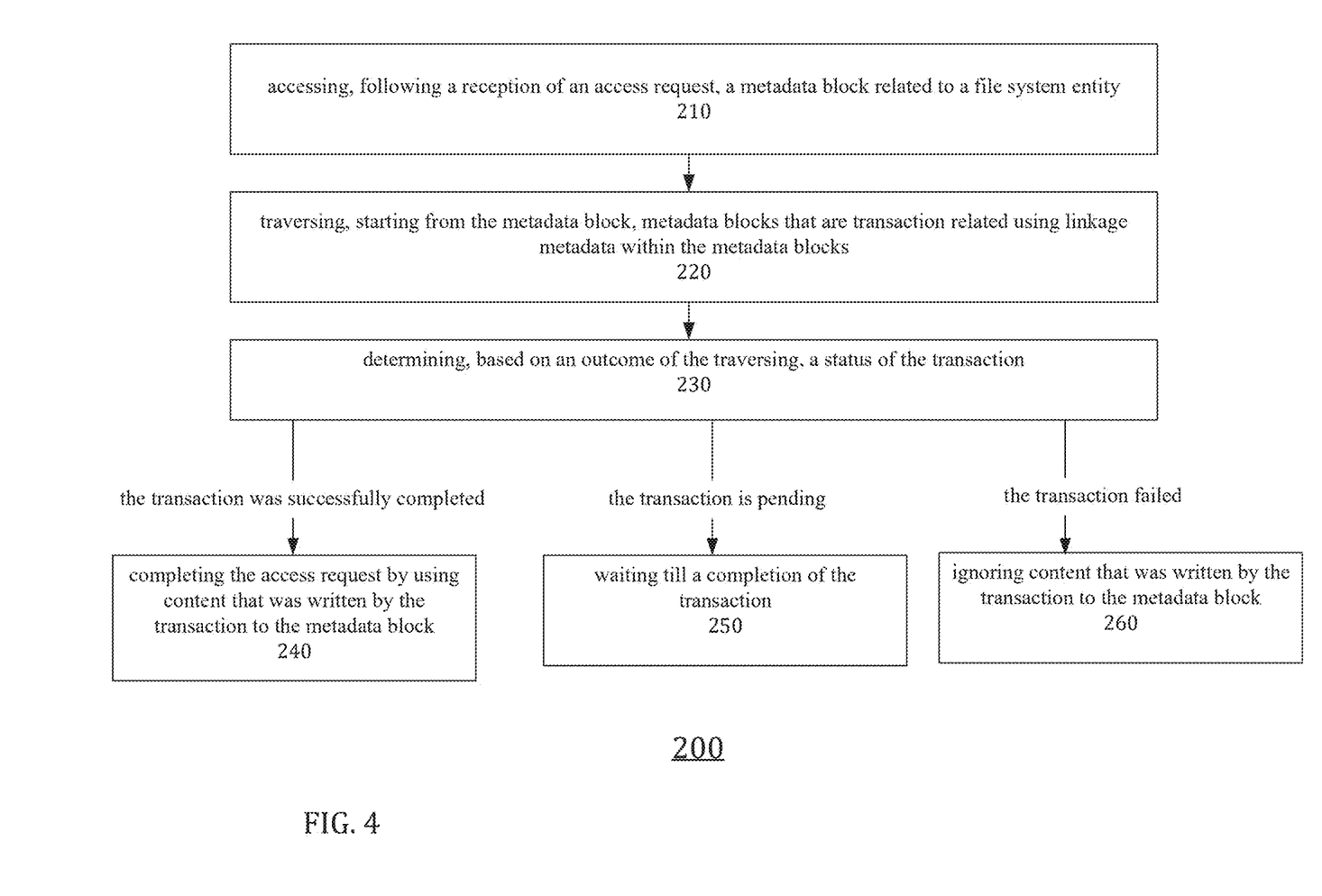
FIG. 4 illustrates an example of a method.

FIG. 4 illustrates an example of method 200 for accessing metadata blocks that were recently updated by a no commit transaction. A no commit transaction is a transaction that is not being marked as committed when completed successfully, so as to avoid the extra accesses to a data structure that manages transaction. Therefore, a subsequent access request needs to check the completeness of the transaction.

According to an embodiment, method 200 includes step 210 of accessing, following a reception of an access request, a metadata block related to a file system entity; the metadata block is associated with a transaction identifier that is indicative of a transaction that is a most recent transaction that modified the metadata block. The access request may be a request to access a FSE that was involved in a transaction that updated the metadata block. Alternatively, the access request may be issued as part of a background process for detecting unresolved transactions.

According to an embodiment, step 210 is followed by step 220 of traversing, starting from the metadata block, metadata blocks that are transaction related, using linkage metadata within the metadata blocks. The metadata blocks are related to the most recent transaction indicated by the transaction identifier. The traversal starts with linkage metadata found within the metadata block that started the traversal.

Assuming, for example, that the accessed metadata block is metadata block 102 of FIG. 2 that includes reference list 112 that points to metadata block 103. Metadata block 102 is accessed and its reference list 113 points to metadata block 104. Metadata block 104 is accessed and its reference link 114 points to metadata block 101. Metadata block 101 is accessed and its reference list 111 points to metadata block 102.

At least some iterations of the traversing may be performed in parallel. When a linkage metadata includes multiple block references, the handling of the paths that starts from these block references—can be performed in parallel. For example, if the accessed metadata block is 102 of FIG. 3, then by using linkage metadata (ref) 332, the traversal continues by reading blocks 101, 103 and 104, in parallel, as well as analyzing their linkage metadata. In cases where the linkage metadata includes longer paths then the path illustrated in FIG. 3, then the entire paths, that descends from blocks 101, 103 and 104 are traversed in parallel. The traversal may be performed in a recursive manner, e.g., when paths split.

According to an embodiment, step 220 is followed by step 230 of determining, based on an outcome of the traversing, a status of the transaction.

The status is selected out of a successful transaction (see the example above), a failed transaction or a pending transaction (yet to be a completed transaction).

According to an embodiment, the determination is based on the outcome of the traversing and does not require accessing a ledger allocated to registering a progress of the transaction. The traversing does not require using such a ledger—and it based on the linkage metadata (such as reference lists 111, 1112, 113 and 114 of FIG. 1) and may also be based on the status of the compute entity that executed the transaction.

According to an embodiment, step 230 included determining that the transaction was successfully completed when (i) each one of the metadata blocks refers to at least one other metadata block and is referred by at least one different metadata block, and (ii) the transaction reaches each metadata block mentioned in a linkage metadata of any one of the metadata blocks.

According to an embodiment, step 230 includes determining that the transaction is still on-going when reaching a metadata block that is not yet linked to another metadata block. According to an embodiment, the transaction may be presumed as failed—and an additional evaluation is required.

Referring to the example of FIG. 1, assuming that the transaction is not completed—and while metadata block 104 is pointed by metadata block 103—reference list 114 is still empty—because the metadata block 104 was not updated yet by the transaction.

According to an embodiment—when it is determined that the transaction was successfully completed—step 230 is followed by step 240, when it is determined that the transaction failed—step 230 is followed by step 260, and when it is determined that the transaction may be pending then step 230 is followed by step 250.

According to an embodiment, step 250 includes waiting till a completion of the transaction. According to an embodiment, there is provided a timeout period after which a pending transaction is deemed failed.

According to an embodiment, step 240 includes completing the access request by using content that was written by the transaction to the metadata block. E.g., completing the access request may include creating and sending a response, wherein the response to the access request may include the content that was written by the transaction. For example, the transaction may be performed for moving a file from a source directory to a target directory, and therefore, the transaction adds to the metadata block (which belongs to the target directory) an indication that the file now exists in the target directory, along with the transaction identifier of the transaction. The metadata block may be accessed by a subsequent access request to obtain the list of files of the target directory. If it is determined that the transaction is completed, then—the file, indicated as added by the transaction, will be added to the list of files of the directory to be sent as a response of the request. If it is determined that the transaction is failed, then the file will be omitted from the list of files.

According to an embodiment, step 260 includes ignoring content that was written by the transaction to the metadata block. The ignoring of content may include omitting the content from the response to the access request.

Figure 5:
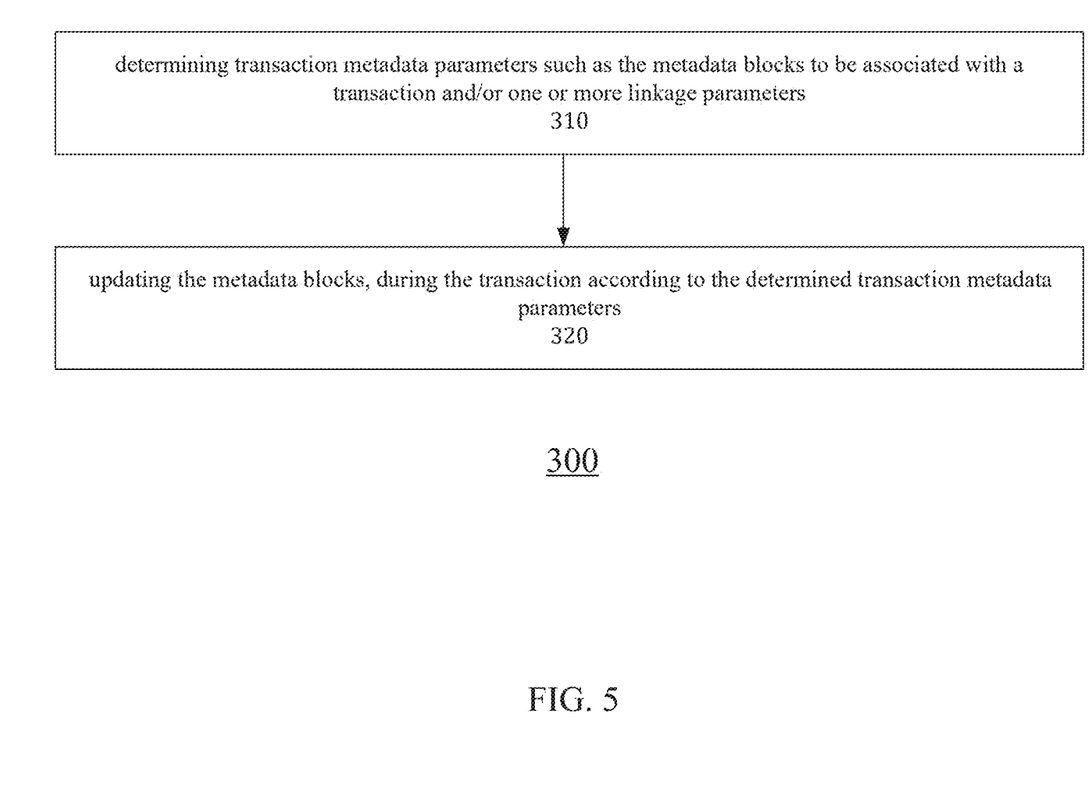
FIG. 5 illustrates an example of a method.

FIG. 5 illustrates an example of method 300 for executing a no-commit transaction.

According to an embodiment, method 300 includes step 310 of determining transaction metadata parameters such as the metadata blocks to be associated with a transaction (and to be updated by the transaction) and/or one or more linkage parameters. According to an embodiment, a linkage parameter includes the identity of the metadata blocks and/or the manner in which the metadata blocks are linked. For example—FIGS. 1-3 illustrate the same metadata blocks—but the manner in which they are linked differs from one figure to another. In FIG. 1 each metadata block refers to a single metadata block and is referred to by a single metadata block. In FIG. 3 the first metadata block refers to all three other metadata blocks—which only refer to the first metadata block. According to an embodiment at least one metadata block points to a single other metadata block.

Step 310 may determine how many references to other metadata blocks should be included in each updated metadata block, which may be dependent on the amount of free space in the metadata block, or the amount of space that expected to be occupied by metadata content other than the transaction information. For example, a pointer metadata block (a metadata block that includes pointers to data) of a large file or a file that is frequently being written to, is expected to be almost entirely filled up with pointers. So, even if such a pointer metadata block yet includes a large amount of free space, it is expected to be exhausted soon, and it may be preferred to add a small number of references, or even only one reference to another metadata block. If the metadata block has a large amount of free space and the metadata block is not expected to be filled up with metadata content-then it may be decided to add multiple or all the pointers to other metadata blocks. Therefore, the decision may rely, for example, on the amount of free space, on a type of the metadata block, on an estimation of the expected fill-up pace of the metadata block, etc.

The decision of step 310 may further take into account, which metadata block is frequently being accessed, or usually accessed first, when accessing the FSE. For example, a metadata block that includes file attributes may be a metadata block that is usually accessed first, and therefore it may be decided to store all the references to other metadata blocks in such a metadata block. This approach will facilitate a faster analysis of the transaction completion state, by step 220 of traversing, of method 200.

According to an embodiment, step 310 is followed by step 320 of updating the metadata blocks, during the transaction according to the determined transaction metadata parameters. For example—writing the transaction identifier and the linkage metadata (e.g., reference lists) of each metadata block, and the like.

According to an embodiment, method 300 does not include keeping a journal for logging the transactions, or managing any transaction state data structures, and there is no need to register a transaction as uncommitted or committed.

Figure 6:
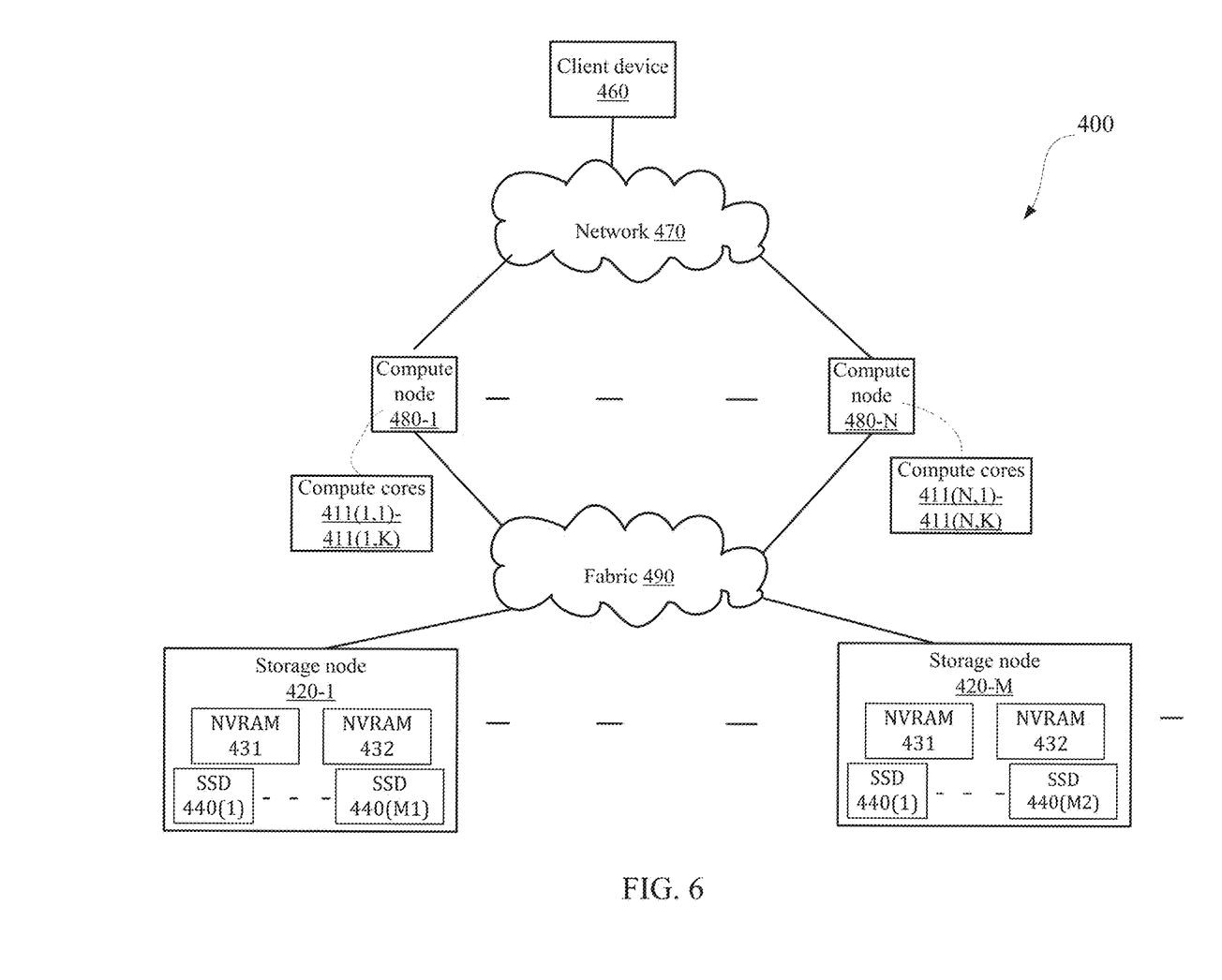
FIG. 6 is an example of a storage system.

FIG. 6 shows an example diagram of a storage system 400 according to the disclosed embodiments.

The storage system 400 includes a number of N compute nodes 480-1 through 480-N (hereinafter referred to individually as a compute node 480 and collectively as compute nodes 480, merely for simplicity purposes, N is an integer equal to or greater than 1). The compute nodes include (or may execute) multiple compute cores each—see for example compute cores 411(1,1)-411(1,K) and compute cores 411(N,1)-411(N,K). A compute core can be a processing circuit, a part of processing circuit, and the like. The processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits. The compute entities may be the compute nodes or the compute cores.

The storage system 400 also includes a number of M storage nodes 420-1 through 420-M (hereinafter referred to individually as a storage node 420 and collectively as storage nodes 420, merely for simplicity purposes, M is an integer equal to or greater than 1). The compute nodes 480 and the storage nodes 420 are connected through a communication fabric 490. M may equal N or may differ from N.

Each compute node 480 interfaces with multiple client devices (that include accessing entities) such as a client device 460 (or an application installed therein) via a network 470. To this end, a compute node 480 is configured to receive requests (e.g., read or write requests) and promptly serve these requests in a persistent manner. The network 470 may be, but is not limited to, a local area network (LAN), a wide area network (WAN), and the like.

In an embodiment, a compute node 480 is configured to interface with different protocols implemented by the client devices or applications (e.g., TCP/IP, HTTP, FTP, various filesystem protocols, etc.) and to manage the read and write operations to the storage nodes 420.

According to an embodiment, the compute nodes are configured to perform one or more steps of methods 200 and 300.

The storage nodes 420 provide the storage and state in the system 400. Each storage node 420 may include a plurality of SSDs, such as SSDs 440, for example storage node 420-1 includes M1 SSDs 440(1)-340(M1). According to an embodiment, the metadata blocks may be stored in NVRAM 431 and 432 of FIG. 4 or in SSDs 440.

The storage nodes 420 may be configured to have the same capacity as each other or different capacities from each other. In an embodiment, the data stored in each storage node 420 is made redundant internally within the storage node, made redundant at a different storage node, or both.

A compute nodes 480 may be configured to communicate with the storage node 420 over the communication fabric 490. It should be noted that each compute node 480 can communicate with each storage node 420 over the communication fabric 490. Each compute node is further configured to perform direct memory access, over communication fabric 490, towards storage devices of the storage nodes. There may not be a direct coupling between a compute node 480 and storage node 420.

In the embodiment, the communication fabric 490 may include an Ethernet fabric, an InfiniBand fabric, and the like. Specifically, the communication fabric 490 may enable communication protocols such as, but not limited to, remote direct memory access (RDMA) over Converged Ethernet (ROCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for metadata blocks access, the method comprising:
   accessing, following a reception of an access request, a metadata block related to a file system entity; the metadata block is associated with a transaction identifier that is indicative of a transaction that is a most recent transaction that modified the metadata block;
   traversing, starting from the metadata block, metadata blocks that are transaction related, using linkage metadata within the metadata blocks;
   determining, based on an outcome of the traversing, a status of the transaction;
   when it is determined that the transaction was successfully completed then completing the access request by using content that was written by the transaction to the metadata block; wherein upon a time of a successful completion of the transaction, each metadata block that was traversed is: (i) pointed by at least one other metadata block that was traversed, and (ii) comprises linkage metadata pointing to at least one different metadata block that was traversed; and
   when it is determined that the transaction failed then ignoring content that was written by the transaction to the metadata block.

2. The method according to claim 1, further comprising waiting till a completion of the transaction when it is determined that the transaction is still ongoing.

3. The method according to claim 2, comprising determining that the transaction is still on-going when reaching another metadata block that is not yet linked to another metadata block.

4. The method according to claim 1, wherein the determining of the status of the transaction is executed without accessing a ledger allocated to registering a progress of the transaction.

5. The method according to claim 1, wherein the transaction is executed without utilizing a ledger allocated to registering a progress of the transaction.

6. The method according to claim 1, wherein the determining of the status of the transaction is executed based on the linkage metadata within the at least some of the metadata blocks.

7. The method according to claim 1, wherein the determining of the status of the transaction is executed based solely on (i) the linkage metadata within the at least some of the metadata blocks, and (ii) a status of a processing circuit that executed the transaction.

8. The method according to claim 1, wherein upon the successful completion of the transaction, at least one of the metadata blocks points only to a single different other metadata block.

9. A method for metadata blocks access, the method comprising:
   accessing, following a reception of an access request, a metadata block related to a file system entity; the metadata block is associated with a transaction identifier that is indicative of a transaction that is a most recent transaction that modified the metadata block;
   traversing, starting from the metadata block, metadata blocks that are transaction related, using linkage metadata within the metadata blocks;
   determining, based on an outcome of the traversing, a status of the transaction;
   when it is determined that the transaction was successfully completed then completing the access request by using content that was written by the transaction to the metadata block;
   when it is determined that the transaction failed then ignoring content that was written by the transaction to the metadata block; and
   wherein the linkage metadata of the metadata block comprises one or more pointers to one or more other metadata blocks, wherein a number of the one or more pointers is determined based on a defined tradeoff between metadata block vacancy and a duration of the traversal.

10. A non-transitory computer readable medium for metadata block access, the non-transitory computer readable medium stores instructions for:
    accessing, following a reception of an access request, a metadata block related to a file system entity; the metadata block is associated with a transaction identifier that is indicative of a transaction that is a most recent transaction that modified the metadata block;
    traversing, starting from the metadata block, metadata blocks that are transaction related, using linkage metadata within the metadata blocks;
    determining, based on an outcome of the traversing, a status of the transaction;
    when it is determined that the transaction was successfully completed then completing the access request by using content that was written by the transaction to the metadata block; wherein upon a time of a successful completion of the transaction, each metadata block that was traversed: (i) is pointed by at least one other metadata block that was traversed, and (ii) comprises linkage metadata pointing to at least one different metadata block that was traversed; and
    when it is determined that the transaction failed then ignoring content that was written by the transaction to the metadata block.

11. The non-transitory computer readable medium according to claim 10, that further stores instructions for waiting till a completion of the transaction when it is determined that the transaction is still ongoing.

12. The non-transitory computer readable medium according to claim 11, that further stores instructions for determining that the transaction is still on-going when reaching another metadata block that is not yet linked to another metadata block.

13. The non-transitory computer readable medium according to claim 10, wherein the determining of the status of the transaction is executed without accessing a ledger allocated to registering a progress of the transaction.

14. The non-transitory computer readable medium according to claim 10, wherein the transaction is executed without utilizing a ledger allocated to registering a progress of the transaction.

15. The non-transitory computer readable medium according to claim 10, wherein the determining of the status of the transaction is executed based on the linkage metadata within the at least some of the metadata blocks.

16. The non-transitory computer readable medium according to claim 10, wherein the determining of the status of the transaction is executed based solely on (i) the linkage metadata within the at least some of the metadata blocks, and (ii) a status of a processing circuit that executed the transaction.

17. The non-transitory computer readable medium according to claim 10, wherein upon the successful completion of the transaction, at least one of the metadata blocks points only to a single different other metadata block.

18. The non-transitory computer readable medium according to claim 10, wherein the linkage metadata of the metadata block comprises one or more pointers to one or more other metadata blocks, wherein a number of the one or more pointers is determined based on a defined tradeoff between metadata block vacancy and a duration of the traversal.

\* \* \* \* \*